United States Patent

[11] 3,621,083

| [72] | Inventor | Glenn R. Price<br>San German, P.R. |
|---|---|---|
| [21] | Appl. No. | 725,505 |
| [22] | Filed | Apr. 30, 1968 |
| [45] | Patented | Nov. 16, 1971 |
| [73] | Assignee | Stauffer Chemical Company<br>New York, N.Y. |

[54] PROCESS FOR PREPARATION OF PHOSPHORUS CONTAINING COMPOUNDS
7 Claims, No Drawings

[52] U.S. Cl. .................................................. 260/968,
260/545, 260/936, 260/939, 260/940, 260/947
[51] Int. Cl. .................................................. C07f 9/08,
C07f 9/16, C07f 9/22
[50] Field of Search .................................... 260/939,
940, 968, 545 P

[56] References Cited
UNITED STATES PATENTS

| 3,470,271 | 9/1969 | Brotherton et al. ........... | 260/968 |
|---|---|---|---|
| 3,476,837 | 11/1969 | Addor .......................... | 260/968 X |

FOREIGN PATENTS

| 877,671 | 9/1961 | Great Britain ................ | 260/948 |

*Primary Examiner*—Charles B. Parker
*Assistant Examiner*—Richard L. Raymond
*Attorneys*—Donald M. MacKay, Robert C. Sullivan, Paul J. Juettner and Daniel C. Block ABSTRACT: A process for preparing organophosphorus compounds of the formula:

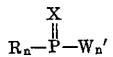

R is a radical substantially hydrocarbon in nature but which can contain relatively inert substituents, X is a chalcogen having an atomic weight less than about 35, W is a pseudohalide selected from CN, NCO, and NCS groups, and $n$ and $n'$ are integers of from one to two, the sum of which is not greater than three. The process comprises reacting an organophosphorus halide of the formula:

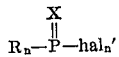

R, X, $n$ and $n'$ are as previously defined and hal is a halogen having an atomic weight between about 30 and 85; with a salt of pseudohalide in the presence of a catalytic amount of a tertiary amine.

PROCESS FOR PREPARATION OF PHOSPHORUS CONTAINING COMPOUNDS

This invention relates to a process for preparing organophosphorus compounds, and more particularly to a process for the preparation of compounds of the formula:

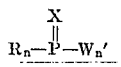

wherein R is a radical substantially hydrocarbon in nature but which can contain relatively inert substituents, X is a chalcogen having an atomic weight of less than about 35, W is a pseudohalide selected from CN, NCO, and NCS groups, and $n$ and $n'$ are integers of from 1 to 2, the sum of which is not greater than 3.

Compounds of the above formula are known and have been prepared by reacting an organophosphorus halide of the formula:

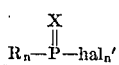

wherein R, X, $n$ and $n'$ are as previously defined and hal is a halogen having an atomic weight between about 30 and 85: with salts of pseudohalides such as metal cyanates, thiocyanates or cyanides. While this method can be employed with some success, the reaction is generally slow requiring from about 12 to up to 72 hours and yields are also low in the neighborhood of about 60 percent pure product.

It has now been discovered that yields of from about 85 to 90 percent can be obtained and the reaction time reduced to about 3 hours by conducting the reaction in the presence of a catalytic amount of a tertiary amine catalyst. Generally from about 0.5 percent to about 5 percent by weight will be sufficient. The reaction can be illustrated by the following reaction diagram:

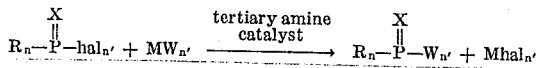

wherein R, X, hal, W, $n$ and $n'$ are as previously defined, and M is a metal.

The tertiary amine catalyst employed can be aliphatic, aromatic or heterocyclic. Examples of suitable aliphatic amines include trimethylamine, triethylamine, tri-n-butylamine, dimethyl cyclohexylamine and diethyl cyclohexylamine. Examples of suitable aromatic amines include dimethyl aniline, and diethyl aniline. Examples of suitable heterocyclic amines include α-picoline, N-methyl piperidine, benzyldimethylamine, pyridine, lutidine and quinoline. Generally, the aliphatic amines will contain from 3 to 12 carbon atoms, the aromatic amines from about 8 to about 20, and the heterocyclic amines from about 4 to about 20.

Salts of pseudohalides which can be used in the process of the invention are the metal cyanates, thiocyanates and metal cyanides. Illustrative of suitable metals are the Group I and II metals, such as lithium, sodium, potassium, calcium, magnesium and barium.

The radical represented by R will generally contain from b 1 to 20 carbon atoms and comprise at least about 5 percent by weight hydrogen and carbon atoms. Examples of suitable radicals include hydrocarbyl such as alkyl, alkoxy, aryl, aryloxy, aralkyl, cycloalkyl, and alkenyl. Suitable substituents include the halogens such as chlorine and bromine, as well as ether, thioether, nitro- and cyano- groups. More particularly, examples of suitable hydrocarbyl include alkyl, such as methyl, ethyl, isopropyl, amyl, decyl or octadecyl; aryl, such as phenyl, tolyl, xylyl, diphenyl, or naphthyl; aralkyl, such as benzyl or phenylethyl; and cycloalkyls, such as cyclopentyl, methyl cyclopentyl, ethyl cyclohexyl, or dimethyl cyclohexyl; olefins, such as allyl, methallyl, butenyl, pentenyl, hexenyl, heptenyl, octenyl and nonenyl. Examples of suitable substituted hydrocarbyl include halo-hydrocarbyl such as chloromethyl, chloroethyl, chloroisopropyl, bromomethyl, bromoethyl, fluoromethyl, fluoroethyl, chlorophenyl, chlorobenzyl, chloromethylcyclohexyl and chlorocyclohexyl; nitrohydrocarbyl, such as nitroethyl, nitrophenyl and nitrocyclohexyl; cyanohydrocarbyl, such as cyanophenyl, cyanoethyl; alkoxyhydrocarbyl, such as ethoxyethyl, anisyl, phenetyl, methoxyethyl; carbalkoxyhydrocarbyl, such as methyl ether, ethylmethyl ether, ethyl ether, ethylpropyl ether, vinyl ether, allyl ether, phenyl ether, benzylphenyl ether, benzyl ether and naphthyl ether; and aryloxy hydrocarbyl, such as phenoxymethyl, phenoxyethyl and phenoxypropyl, hydrocarbylamido and diamido such as formamide, benzamide and 1,4-diazobicyclo octyl.

Examples of suitable chalcogens which can be employed include both sulfur and oxygen. Chlorine and bromine are illustrative of halogen encompassed by the term hal.

The process of the invention can be conducted at a temperature between about −20° C. and about 200° C., but is preferably conducted at a temperature between about 0° C. and about 125° C. for reasons of economy.

A solvent can be employed but none is required. If employed, the solvent should not contain active hydrogen atoms which will react with the reaction product of the pseudohalide and organophosphorous halide and, accordingly, materials such as alcohols, phenols, amines or mercaptans are unsuitable in many cases. Examples of suitable inert organic solvents include methylene chloride, diglyme, dimethyl formamide, nitrobenzene, chloroform, tetrahydrofuran and diethyl ether.

The reaction can be conducted employing the reactants in stoichiometric proportions or an excess of either reactant can be employed. Generally, it is beneficial to employ an excess of salt of the pseudohalide of from about 5 percent to about 100 percent in order to insure complete reaction. The product can be easily recovered by conventional means such as distillation, but it is preferred that a solvent be employed in which the metal halide is insoluble so that the metal halide will precipitate and can be readily filtered off. The solvent may then be evaporated to recover the desired phosphorus-containing compound.

Inasmuch as the phosphorus-containing compounds by the process of the invention are known compounds, a complete disclosure of utility is unnecessary. Some of the uses for which these compounds have been used, however, are as intermediates for agricultural pesticides and for reaction with compounds having a reactive hydrogen to prepare a reaction product which can be incorporated in synthetic fibers, elastomers, adhesives and rigid and elastic foams in order to provide flame resistance to the polymer.

The following examples will serve to illustrate the invention and its preferred embodiments.

EXAMPLE 1

Into a reaction flask equipped with an agitator, a thermometer and a reflux condenser, are placed 100 grams of potassium thiocyanate, 250 milliliters of acetone and 20 milliliters of pyridine. To the flask is then added 188.5 grams (1.0 mole) of diethyl phosphorochlorothionate of the formula:

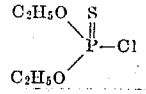

sufficiently slow to permit maintaining the temperature of the mixture at 50° C.; the reaction being an exothermic reaction. After the addition is complete, the reaction mixture is maintained at a temperature of 50° C. for 2 hours. The reaction is then terminated and the mixture allowed to cool to room temperature. Recovery of the product is accomplished by diluting the reaction mixture with 500 cc. of water and evaporating the organic layer and washing said organic layer twice with two portions of 100 cc. of water. The product is then distilled at 76° C. and 2.0 millimeters of mercury to produce 188.0 grams 89 percent yield) of 0,0-diethyl phosphoroisothiocyanatothionate of the formula:

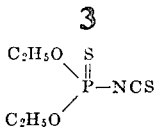

having an index of refraction of $N_D^{25}=1.5230$.

EXAMPLE 2

Into a reaction flask fitted with an agitator, a thermometer and a reflux condenser are placed b 50.0 grams (0.50 mole +6 percent excess) of potassium thiocyanate, 150 milliliters of acetone and 5 milliliters of pyridine. To the flask is then added 82.4 grams (0.5 mole) of o-isopropyl chloromethylphosphonochlorothionate of the formula:

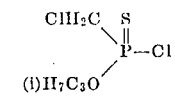

sufficiently slow to permit maintaining the temperature of the exothermic reaction at 50° C. After the addition is complete, the reaction mixture is maintained at a temperature of 50° C. for 1 hour. The reaction is then terminated, the reaction mixture allowed to cool to room temperature and the potassium chloride byproduct removed by filtration. The acetone solvent is then removed by distillation, the organic layer washed with two 100 cc. portions of water and the product is recovered by distillation at 75° C.—1.0 to 1.5 millimeters of mercury pressure. The product is identified as o-isopropyl chloromethyl-phosphonoisothiocyanatothionate (78.9 percent yield) of the formula:

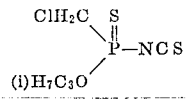

having an index of refraction of $N_D^{25}=1.5558$.

EXAMPLE 3

In accordance with the procedure of example 1, 81 grams of sodium thiocyanate and b 20 grams of 2,4-diazabicyclo [2,2,2] octane in 500 milliliters of acetone are reacted with 171 grams of N, N, N', N'-tetramethyl phosphorodiamidic chloride at 60° C. for four hours. The product obtained in N, N, N', N'-tetramethyl phosphorodiamidic isothiocyanate of the formula:

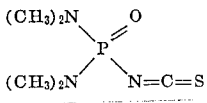

EXAMPLE 4

In accordance with the procedure of example 1, 6.5 6.5grams of lithium thiocyanate and 1 milliliter of triethylamine in 50 milliliters of butanone are reacted with 14.0 grams of diethylphosphinic chloride at 50° C. for three hours. The product obtained is diethylphosphinic isothiocyanate of the formula:

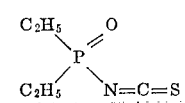

EXAMPLE 5

In accordance with the procedure of example 2, 16.5 grams of sodium thiocyanate and 2 milliliters of N-methyl piperidine in 50 milliliters of N,N-dimethylacetamide are reacted with 44.5 grams of S-phenyl methylphosphonochlorodithioate for 2 hours at 40° C. The product isolated is S-phenyl methyl-phosphonochloroisothiocyanatodithioate of the formula:

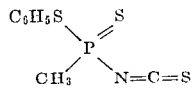

EXAMPLE 6

In accordance with the procedure of example 1, 16.6 grams of silver thiocyanate, 2 milliliters of benzyl dimethylamine in 70 milliliters of acetonitrile are reacted with 14.1 grams of 2-chloro-2-oxo-1,3,2-dioxaphospholane at 55° C. for 3 hours. The product obtained is 2-isothiocyanato-2-oxo-1,3,2-dioxaphospholane of the formula:

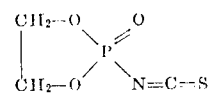

EXAMPLE 7

In accordance with the procedure of example 1, potassium cyanate and dibutyl phosphonochloridothioate are reacted in the presence of 2,6-lutidine to produce dibutyl-phosphonoisocyanatothionate.

EXAMPLE 8

In accordance with the procedure of example 1,2, sodium cyanide and diethyl phosphonochloridothioate are reacted in the presence of quinoline to produce diethylphosphorocyanothionate.

What is claimed is:

1. A process for preparing organophosphorus compounds of the formula:

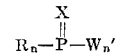

wherein R is selected from the group consisting of lower alkyl, chloro lower alkyl, alkoxy and dimethylamino radicals, X is oxygen or sulfur, W is a pseudohalide selected from CN, NCO, and NCS groups, and $n$ and $n'$ are integers of from 1 to 2 the sum of which is not greater than 3; which comprises reacting an organophosphorus halide of the formula:

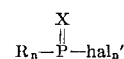

wherein R, X, $n$ and $n'$ are as previously defined and hal is chlorine or bromine with a Group I or II metal salt of a pseudohalide in the presence of a catalytic amount of a tertiary amine which contains from 3 to about 20 carbon atoms and is selected from the group consisting of trimethylamine, triethylamine, tri-n-butylamine, dimethyl cyclohexylamine, diethyl cyclohexylamine, dimethyl aniline, diethyl aniline, α-picoline, N-methylpiperidine, benzyldimethylamine, pyridine, lutidine and quinoline.

2. The process of claim 1, wherein the salt of the pseudohalide is a metal thiocyanate.

3. The process of claim 1, wherein the catalyst is present in an amount from about 0.5 percent to about 5 percent by weight.

4. The process of claim 1, wherein the process is conducted at a temperature between about −20° C. and about 200° C.

5. The process of claim 1, wherein the reaction is conducted at a temperature between about 0° C. and about 125° C.

6. The process of claim 1, wherein the reaction is conducted in the presence of an inert organic solvent.

7. The process of claim 1, wherein the salt of the pseudohalide is present in an amount of from about 5 percent to about 100 percent in excess of stoichiometric requirements.

* * * * *